United States Patent
Cattelli et al.

[11] Patent Number: 5,685,125
[45] Date of Patent: Nov. 11, 1997

[54] PLANT FOR THE INDUSTRIAL PRODUCTION OF LONG-LIFE READY-TO-EAT, COOKED FOODS

[75] Inventors: Camillo Cattelli; Roberto Notari, both of Parma, Italy

[73] Assignee: Rossi & Catelli, Parma, Italy

[21] Appl. No.: 472,654

[22] Filed: Jun. 7, 1995

[30] Foreign Application Priority Data

Jul. 4, 1994 [IT] Italy .................. MI94A1391

[51] Int. Cl.$^6$ .................................................. B65B 63/08
[52] U.S. Cl. .......................... 53/127; 53/167; 53/287; 99/470; 99/371; 99/361; 99/366; 99/367
[58] Field of Search .................. 53/127, 167, 287; 426/316, 403; 99/359, 360, 361, 366, 365, 371, 470

[56] References Cited

U.S. PATENT DOCUMENTS

| | | | |
|---|---|---|---|
| 2,575,863 | 11/1951 | Clifcorn | 99/361 X |
| 3,859,774 | 1/1975 | Bausch | 53/167 |
| 3,889,009 | 6/1975 | Lipoma | 426/234 |
| 4,015,935 | 4/1977 | Andersson et al. | 99/366 X |
| 4,045,945 | 9/1977 | Möller et al. | 53/167 |
| 4,059,919 | 11/1977 | Green | 99/470 X |
| 4,116,117 | 9/1978 | Bogaard | 99/361 |
| 4,167,585 | 9/1979 | Caridis et al. | 426/233 |
| 4,169,408 | 10/1979 | Mencacci | 99/355 |
| 4,179,986 | 12/1979 | Mencacci | 99/359 |
| 4,196,225 | 4/1980 | Mencacci | 426/523 |
| 4,346,650 | 8/1982 | Zaitsa | 99/371 X |
| 4,646,629 | 3/1987 | Creed et al. | 99/468 |
| 4,666,722 | 5/1987 | Creed et al. | 99/470 X |
| 4,882,191 | 11/1989 | Bastetti et al. | 426/557 |
| 4,989,725 | 2/1991 | Knabe et al. | 198/774.1 |
| 5,422,130 | 6/1995 | Fox et al. | 9/470 X |
| 5,452,649 | 9/1995 | Taguchi et al. | 99/470 |
| 5,526,736 | 6/1996 | Buriani et al. | 99/470 |

FOREIGN PATENT DOCUMENTS

| | | |
|---|---|---|
| 0 312 335 | 4/1989 | European Pat. Off. . |
| 2120765 | 8/1972 | France . |
| 2531044 | 2/1984 | France . |
| 2581291 | 11/1986 | France . |
| 1902698 | 1/1969 | Germany . |
| 1099785 | 6/1978 | Italy . |
| 1146544 | 7/1988 | Italy . |
| 21341 A 88 | 7/1988 | Italy . |
| 1199285 | 7/1970 | United Kingdom . |
| 1439972 | 6/1976 | United Kingdom . |
| 1503350 | 3/1978 | United Kingdom . |
| 2006605 | 5/1979 | United Kingdom . |
| 1593962 | 7/1981 | United Kingdom . |
| 2223469 | 4/1990 | United Kingdom . |
| WO90/04928 | 5/1990 | WIPO . |

*Primary Examiner*—Daniel Moon
*Attorney, Agent, or Firm*—Flehr, Hohbach, Test, Albritton and Herbert LLP

[57] ABSTRACT

A plant is described which includes a continuous heat processing autoclave (1) for cooking and sterilizing food measured into tray-like containers (9). The open containers (9), loaded on to trays (12), are advanced through the autoclave (1) by a conveyor (40) operated stepwise. A cooling chamber (6) communicates at one end with the autoclave (1) through a pre-cooling and air-lock tunnel (7) and at the other with a sterile environment in which a sterile closure unit seals the containers (9) of cooked food.

10 Claims, 7 Drawing Sheets

PLANT FOR THE INDUSTRIAL PRODUCTION OF LONG-LIFE READY-TO-EAT, COOKED FOODS

CROSS REFERENCE TO RELATED PATENT

The plant described and claimed herein includes a continuous autoclave described in detail in a patent application entitled An Autoclave for the Continuous Cooking and Sterilizing of Food Products in General, Ser. No. 08/590, 617, filed concurrently herewith on Jun. 7, 1995 by the same applicant and naming the same inventors as this application. The contents of the concurrently filed application are incorporated herein for reference purposes.

BACKGROUND OF THE INVENTION

The present invention relates, in general, to a plant for the industrial production of long-life, ready-to-eat, cooked food.

In particular, the invention relates to a plant in which food products arranged in open containers are cooked and/or sterilized on a continuous production line, the containers then being sealed and packaged in sterile conditions so as to obtain, for example, so-called long-life ready meals.

In general, in the preparation of cooked foods of the type described, it is necessary to satisfy a dual requirement, that is, on the one hand, to ensure that the product is non-toxic for the entire long-life period stated and, on the other, to keep the physical and organoleptic qualities of the product as close as possible to those of a freshly prepared product.

To this end, the prior art offers numerous processes which may be divided into two groups, each based on respective different techniques for providing the heat for the stabilizing/sterilizing and cooking, that is:

1) processes which use electromagnetic energy (in particular microwaves or infrared radiation) to provide the required heat, and
2) processes which use steam and/or a cooking liquid (for example water, oil and the like).

BRIEF SUMMARY OF THE INVENTION

The invention relates to techniques of the second group for which it is well known that the equipment available has such specialized structural and operating characteristics that it is usually impossible to use the same equipment not only to carry out two different processes but even to carry out the same process on two different products, even if these belong to a same product family. This is especially true when the chosen process must be carried out on a continuous production line.

It is in fact known that, in order to obtain the best product from an organoleptic point of view as well as that of the product-life, it is necessary to use different temperatures, processing times and pressures not only for different categories of product (such as pasta, meat, game and all types of vegetables) but also for products of the same family but of different thickness, dimensions, consistency, weight or shape.

It is therefore understandable that the inflexible application of prior art equipment constitutes a serious problem for all companies interested in producing long-life cooked products, for example ready meals, spread over a broad range of basic products. The few attempts to adapt a plant to producing different cooked products have resulted in marketed products which are not totally satisfactory from an organoleptic point of view.

The problem forming the basis for this invention is that of developing and providing a technique whereby food products arranged in open containers may be cooked and/or sterilized in a continuous, automatic production cycle in which each step may be controlled accurately and which may be used equally well to produce various products differing in nature, weight, consistency, dimensions and shape. This problem is solved according to the present invention by a plant of the type under consideration and having the characteristics described in the claims which follow.

Simply by suitable adjustment of its operating parameters (temperature of the heat treatment fluids, processing times, ambient temperature and pressure and the like), the plant of the invention can produce on an industrial scale: all types of sauce based on tomatoes or tomatoes and vegetables; meat casseroles with potatoes, with peas or with other similar ingredients and components; roast meats; rabbit, hare, wild boar and the like cooked "alla cacciatore" (with mushrooms etc); fish-based dishes and starters in general.

The advantages and characteristics of a plant according to the present invention will become clearer from the following description of preferred embodiments thereof, given with reference to the appended drawings also provided purely by way of non-limitative example.

DESCRIPTION OF THE PREFERRED EMBODIMENT

With reference to FIGS. 1 to 4, a description now follows of a plant according to the present invention for the continuous production of so-called ready meals, that is of portions of food products cooked and/or sterilized in open containers in which they are then sealed and packaged under sterile conditions.

This continuous autoclave comprises a cylindrical body 1, with a horizontal axis A, defining a processing chamber 2 in which all the heat treatments required to stabilize and/or sterilize and cook the aforesaid food products can be carried out. The processing chamber 2 is generally a pressurized steam chamber and is always kept in sterile conditions. An inlet region therein for products to be processed is indicated at 3 while an outlet region for processed products is indicated at 4. Near the inlet region 3 is a station 8 where the food to be processed is prepared in dishes, a plurality of such dishes being arranged on one support.

Figures 3, 4:
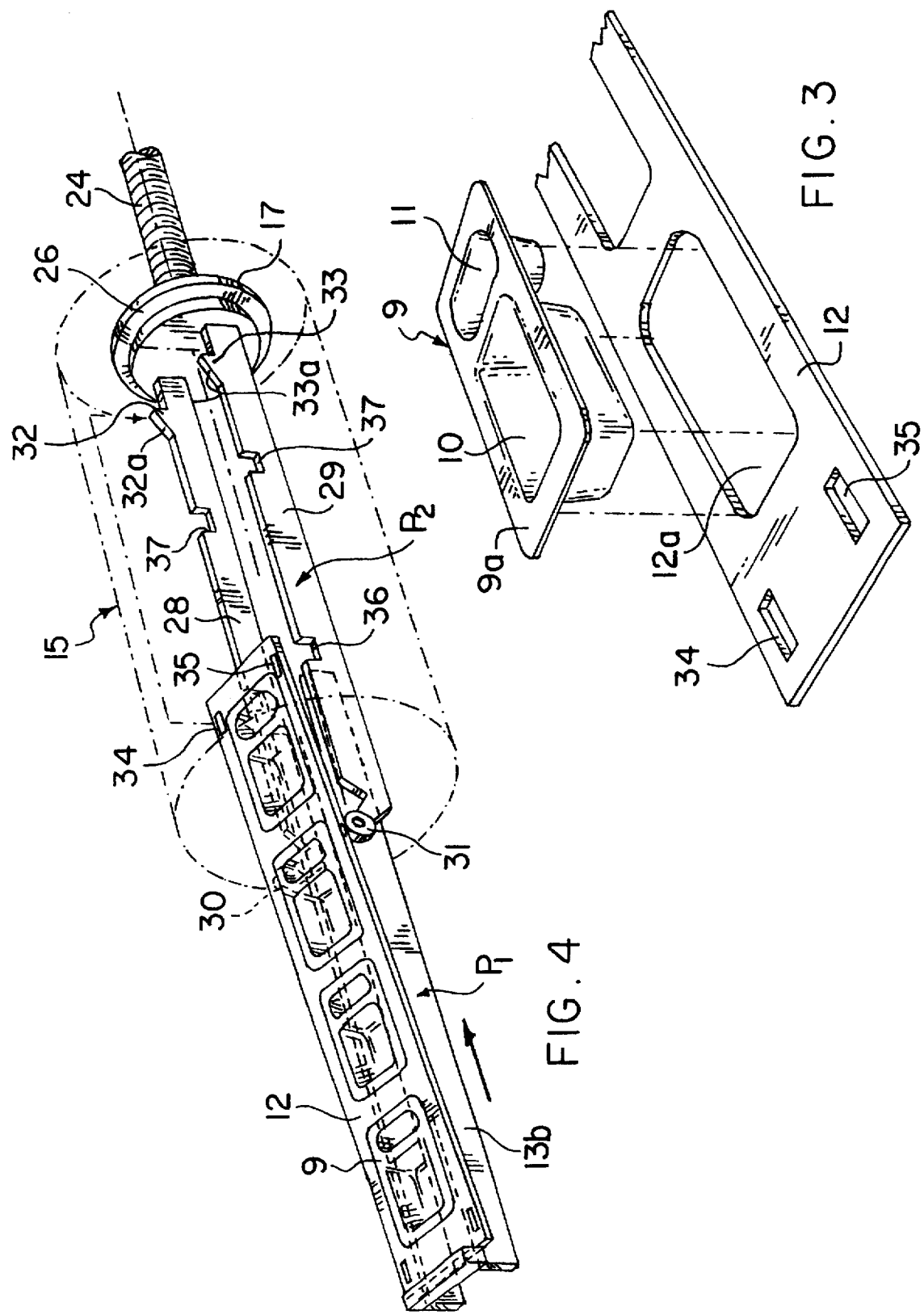
FIG. 3 is an enlarged perspective view of a particular accessory of the plant of the invention.
FIG. 4 is an enlarged perspective view of means for transferring the food products to be processed in the plant of the invention.

As shown in FIG. 3, the dishes may include a dished container or tray 9 with two compartments 10, 11 and a flat, outwardly projecting peripheral edge 9a, while each support is formed as a flat rectangular tray 12 with a number of windows 12a equal to the number of containers 9 to be placed on the tray 12. In the embodiment illustrated, the trays 12 are of a size to take four containers 9 arranged in a line. Obviously it is possible, and in some cases advantageous, to use trays of a size to support a plurality of lines of containers 9. In yet another case, described later, the foodstuffs to be processed can be measured into a single large tray, avoiding the need for the dished containers.

A chamber for receiving the trays 12 with their containers 9 is schematically indicated at 14. In particular, this chamber 14 is of a structure and size to accommodate one tray 12 at a time.

The tray-reception chamber 14 extends to one side of the autoclave body 1, along a horizontal axis B perpendicular to the axis A of the autoclave, and communicates with the inlet region 3 of the processing chamber 2 through an air-lock chamber 15. The air-lock chamber 15 is also outside the autoclave body 1 and extends along the same axis B as the tray-reception chamber 14. Like this latter, the air-lock chamber 15 is of a size to accommodate one tray 12 at a time, arranged along the axis B.

Figure 2:
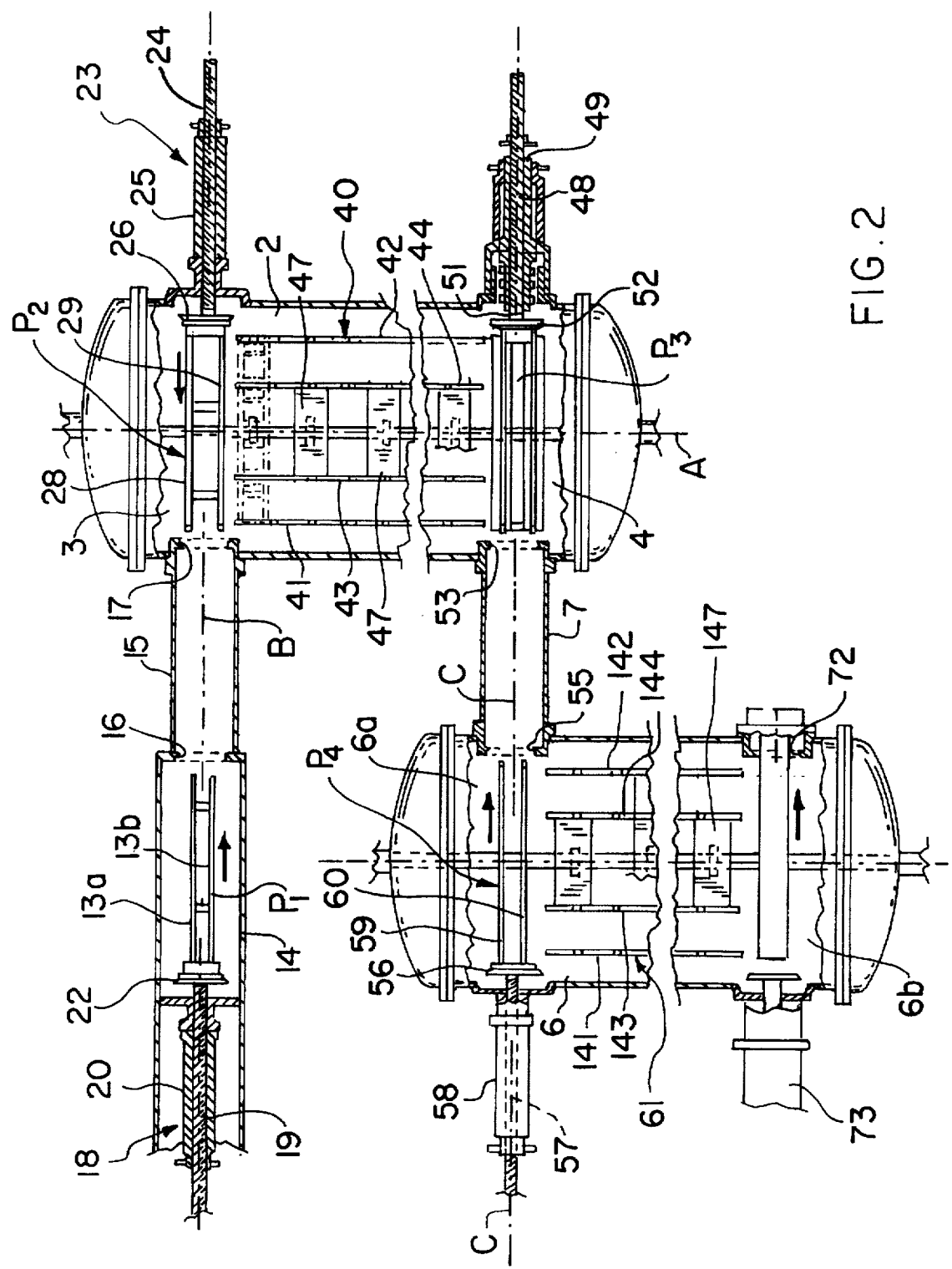
FIG. 2 shows the plant of FIG. 1 partly cut away and on an enlarged scale.

With reference to FIG. 2, the air-lock chamber 15 communicates at one end with the tray-reception chamber 14 through a first circular aperture 16 formed as a valve seat and at the other end with the inlet region 3 of the processing chamber 2 through a second circular aperture 17, also formed as a valve seat.

A first lead-screw arrangement, generally indicated at 18, comprises a screw 19 and a rotatable threaded sleeve element 20, and is supported along the axis B outside the tray-reception chamber 14 at the opposite end thereof from that opening into the air-lock chamber 15. At one end, the screw 19 has an obturator disk 22 structured and dimensioned to cooperate with the valve seat aperture 16 so as to seal the air-lock chamber 15 hermetically when required.

A second lead-screw arrangement 23, identical to the first and including a screw 24 and a rotatable threaded sleeve element 25, is also supported along the axis B outside the autoclave body 1 at the opposite end thereof from that which communicates with the airlock chamber 15. The screw 24 of this lead-screw arrangement extends through the cylindrical wall of the body 1, with the interposition of seal means, not shown, and the end thereof inside the body 1 has an obturator disk 26 coaxially fixed to it which is structured and dimensioned to engage the valve seat aperture 17 and to seal the airlock chamber 15 hermetically.

A pair of horizontal, parallel tines 13a, 13b is fixed to that face of the obturator disk 22 facing the aperture 16 for supporting the opposite, longer sides of a tray 12. The tines 13a, 13b form a sort of pusher arm $P_1$ driven by the screw 19 for supporting the trays 12 and moving them along the axis B towards the air-lock chamber 15, as will become clear later in this description.

In exactly the same way, the ends of a respective pair of horizontal, parallel tines 28, 29, of about the same length as the trays 12, are fixed to that face of the obturator disk 26 facing the aperture 17 of the air-lock chamber 15 to form a sort of puller arm $P_2$. These tines 28 and 29 are mutually spaced by a greater distance than that separating the previously mentioned tines 13a, 13b with which they cooperate to introduce the trays 12 into the processing chamber 2 one at a time, as will be explained later in this description.

The free ends of the tines 28, 29 (FIG. 4) support respective idle rollers 30, 31 having horizontal axes of rotation perpendicular to the tines themselves. The diameters of the rollers 30, 31 and the positions of their axes are chosen so that the rollers project above the upper edges of the respective tines 28, 29. Near the obturator disk 26, the tines 28, 29 have respective identical teeth 32, 33, substantially like the teeth of a saw, arranged with the beginning of their inclined edges 32a, 33a facing the free ends of the tines. These teeth 32, 33 are intended to engage corresponding slots 34, 35 in the short sides of the trays 12.

Each of the tines 28, 29 also has identical notches 36, 37, of a predetermined width, opening into the upper edges of the tines themselves; the notches 36, 36 are aligned in a direction perpendicular to the tines, as are the notches 37, 37.

A horizontal conveyor 40, of the type generally known as a stepping conveyor, extends longitudinally through the processing chamber 2 in the autoclave body 1, preferably in a diametrical plane thereof, and is supported by conventional means, not shown.

Figure 5:
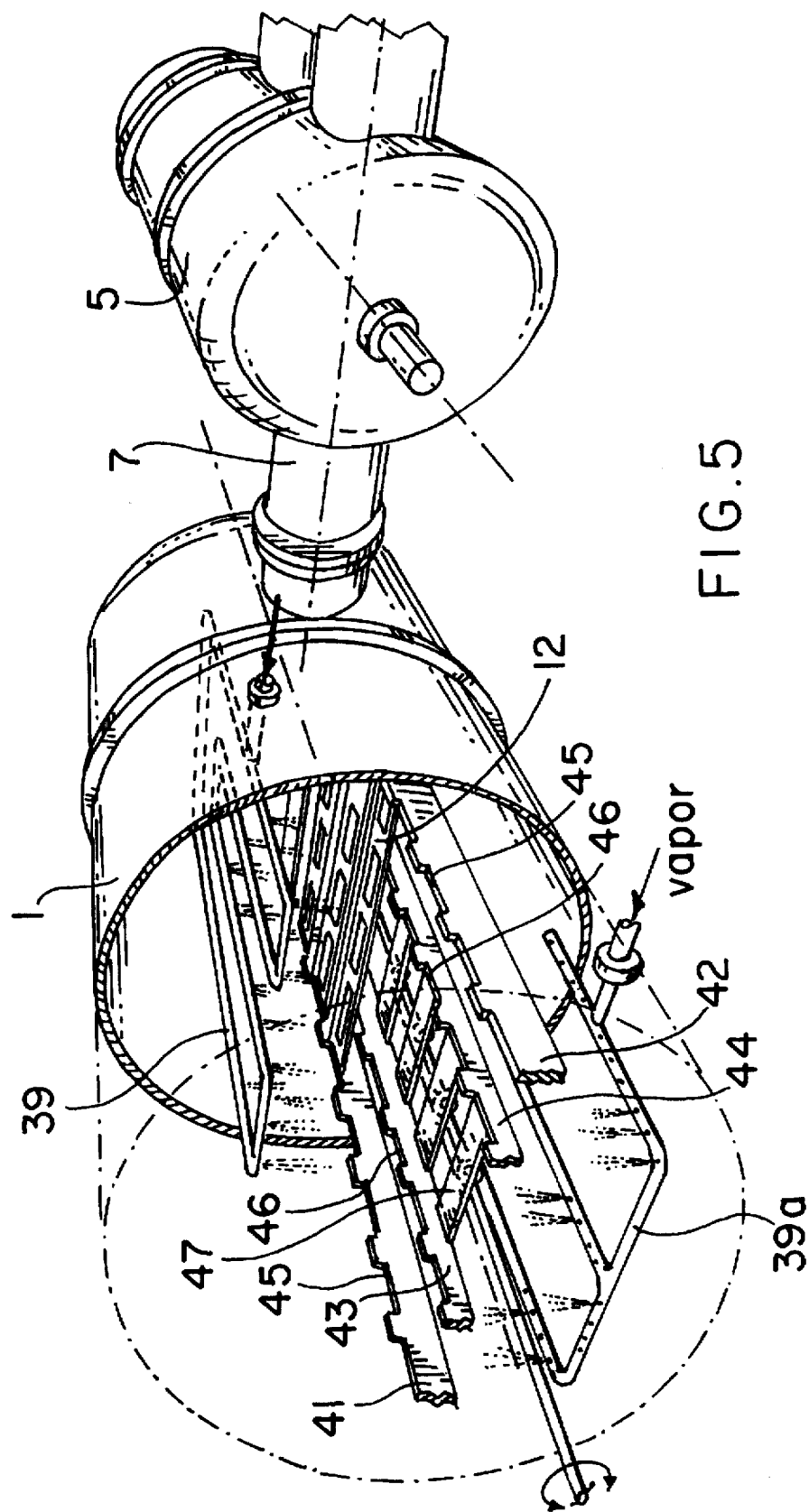
FIG. 5 is an enlarged perspective view of a detail of FIG. 2 seen from inside.

In a preferred embodiment (FIGS. 2 and 5) this conveyor includes a fixed first pair of mutually-spaced, flat, profiled members 41, 42, supported on edge and extending parallel to the axis A from the inlet region 3 to the outlet region 4 of the processing chamber 2. A movable second pair of flat, profiled members 43, 44 is supported on edge between the profiled members 41, 42. The fixed and movable members each have pluralities of rectangular recesses 45, 46 formed in their upper edges, these recesses having a length and depth equal to the width and depth respectively of the trays 12 so that they can engage the trays and hold them in transversely extending positions during the movements of the conveyor, as will be explained later in this description.

The movable profiled members 43, 44 are mutually spaced by a distance equal to the space between the notches 36, 37 in the tines 28, 29 and are of such a thickness that they can slide in these notches 36, 37. In addition, the profiled members 43, 44 are fixed to each other by a plurality of cross-members 47 so as to form a movable rigid frame.

This movable frame is connected by a drive transmission to equipment which can drive its movement in the rectangular path required to advance the conveyor 40 stepwise. In relation to the fixed profiled members 41, 42, and starting from an initial position in which the movable profiled members are a) in a slightly lower position than the fixed profiled members and b) are aligned with the notches 36, 37 in the tines 28, 29 of the puller arm $P_2$ (FIG. 4), this rectangular movement includes:

1. a horizontal movement of the movable profiled members 43, 44 into a position in which they engage the notches 36, 37 passing under any tray supported on the tines 28, 29;

2. a vertical upward movement out of the notches 36, 37 so as to lift the tray 12 from the tines 28, 29;

3. a horizontal movement away from the said tines and, finally, 4. a vertical downward movement returning to the starting position, simultaneously delivering the tray 12 collected from the tines 28, 29 to the fixed profiled sections 41, 42.

Since various equipment for driving the conveyor 40 and the transmission means connecting it to the movable frame are known per se, they are neither described nor shown in detail here. To advantage, the equipment described in relation to the continuous autoclave which forms the subject of a co-pending Patent Application by the same Applicant may be used.

Ducts 39, 39a extend longitudinally through the processing chamber 2 for delivering and metering the fluids required for the heat-processing of the food portions in the containers 9.

A lead-screw drive means 50 (FIG. 1) is fixed to the outside of the outlet region 4 of the body 1 and serves to drive a screw 48 through a rotatable, threaded sleeve element 49. The screw 48 projects at one end 51 into the outlet region 4 of the processing chamber 2 and an obturator disk 52 is fixed coaxially to this end 51. The dimensions and structure of the disk are such that, when engaged with a valve seat 53, it forms a pressurized-fluid-tight seal. When the disk 52 is disengaged from the valve seat 53, the outlet region 4 of the processing chamber 2 is placed into communication with a further, pre-cooling air-lock chamber 7 which extends outside the autoclave body 1 along a horizontal axis C perpendicular to the axis A of the autoclave.

A straight pusher arm $P_3$ is fixed to that face of the obturator disk 52 facing the valve seat 53 and extends parallel to the axis C. The pusher arm $P_3$ is generally of the same structure and dimensions as the pusher arm $P_1$ described above with reference to the inlet side of the processing chamber 2 so as to support a tray 12.

The chamber 7 communicates through a valve seat aperture 55 with the inlet side 6a of a cooling chamber 6; an obturator disk 56 cooperates with the aperture 55 and is fixed coaxially to the free end of a screw 57 driven by an appropriately driven threaded sleeve element 58 extending along the axis C and supported for rotation outside the chamber 6 at the opposite end from the air-lock chamber 7.

A pair of tines 59, 60 is fixed to the face of the obturator disk 56 facing the valve seat 55 so as to form puller arm $P_4$. The puller arm $P_4$ is generally of the same size and structure as the puller arm $P_2$ described above, the tines 59, 60 being spaced so as to receive between them the pusher arm $P_3$ with which they must cooperate as described below.

A stepping conveyor, generally indicated 61, operates in the sterile chamber 6. This conveyor 61, and the drive means thereof, may well be of the same construction as the conveyor 40 and its drive means, in the autoclave body 1. The components of this conveyor 61, which are the same as those of the conveyor 40, are indicated by the same reference numerals with the addition of 100.

About half-way along its length, the chamber 6 communicates through a tubular passage 62 (FIG. 1) with another chamber formed in a body 63 fixed to the side of the chamber 6. A delivery-metering unit 64 for sauces or other condiments is fixed above the tubular passage 62 which is sealed both to the chamber 6 and to the body 63 by suitable flanges and seals.

A closure assembly 69 (not shown in detail as it is known per se) operates under sterile conditions inside the body 63 to seal the containers 9 which are regularly transferred from the chamber 6, as described later.

For this transfer, an expulsion assembly 65 (FIG. 6) is arranged in the chamber 6 under the conveyor 61 for releasing the containers 9 from their respective trays 12. The assembly 65 comprises essentially a horizontal, rectangular, plate-like element 66 having the same transverse dimensions as the trays 12. This element 66 has a plurality of parallel-epipedic projections 67 of such a thickness that they can engage the windows 12a. The rectangular element 66 is mounted on a plurality of shafts 68 driven to move vertically by actuators in themselves known, preferably mechanical actuators.

It should be noted that, when the projections 67 of the element 66 have engaged the windows 12a in a tray 12 to "expel" the respective containers 9 therefrom, they form a continuous support plane with the tray 12 along which the containers 9 may be moved (by sliding) without hindrance. A rectangular grid 70, with large rectangular openings 70a is supported above the conveyor 61, extending parallel to the element 66. Each opening 70a is dimensioned so as to surround a container 9. The grid 70 is movable transversely to the direction in which the conveyor 61 advances.

Figure 1:
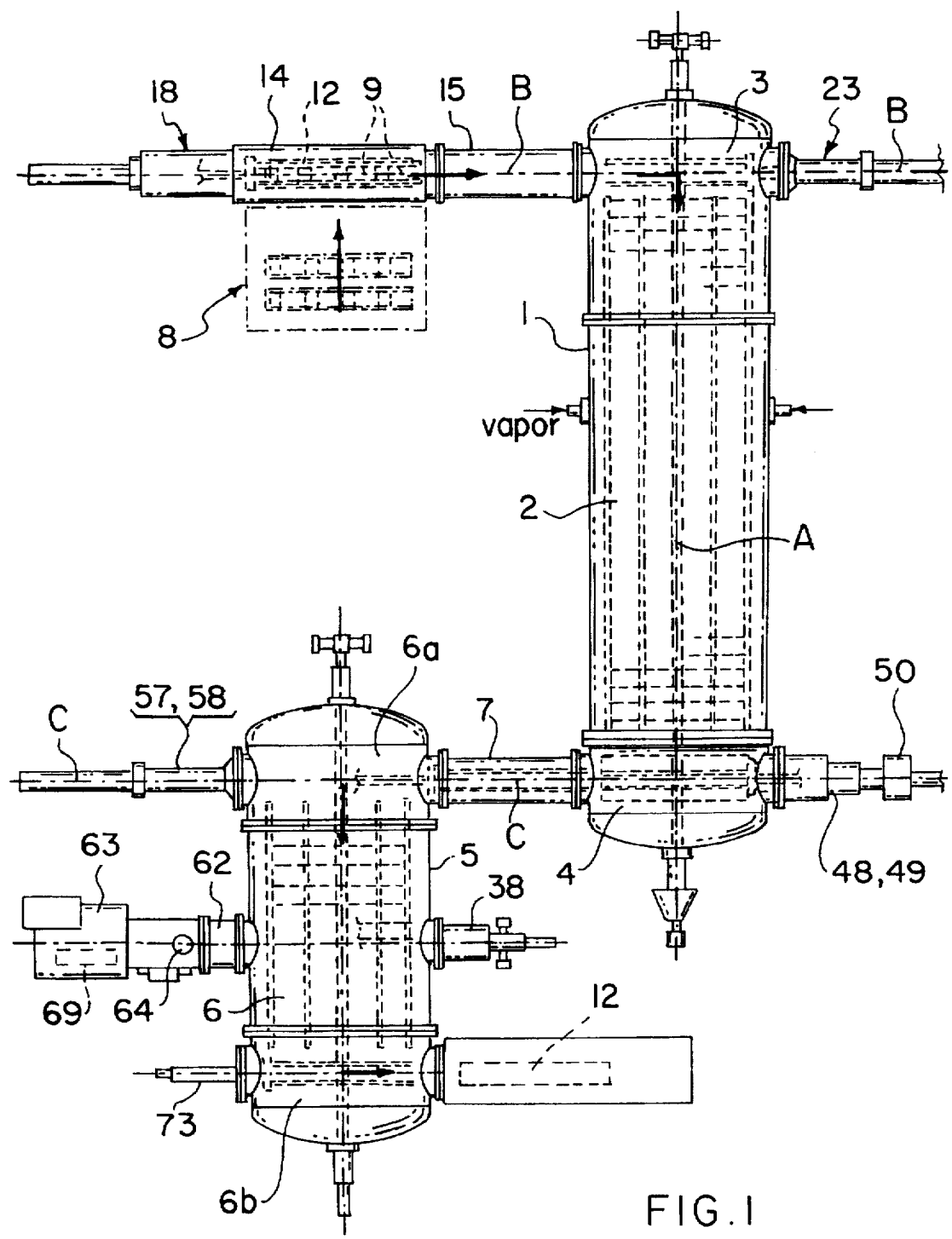
FIG. 1 is a schematic plan of a first embodiment of a plant according to the invention for the continuous production of long-life, ready-to-eat, cooked food products (so-called ready meals)

The drive means for the grid are outside the body 5 and are shown schematically at 38 in FIG. 1. By means of these drive means 38, the grid 70 and the plurality of containers 9 engaged in its openings 70a may be moved laterally off the conveyor 61 onto a shelf 71 extending through the tubular passage 62 where the dispenser 64 for delivering sauces or other similar condiments operates. The shelf 71 is aligned with the working plane of the closure assembly, towards which the containers 9 filled with cooked food are conveyed to be sealed.

The trays 12, once relieved of the containers 9, are carried by the stepping conveyor 61 towards the outlet zone 6b of the chamber 6 where they are ejected through an aperture 72 by a pusher 73 (either a lead-screw assembly or driven pneumatically).

The operation of the autoclave of the invention is explained as follows with reference to a single tray 12 supporting four dished containers 9 with respective portions of food to be processed. In the starting condition, the pusher arm $P_1$ and its associated obturator disk 22 are fully withdrawn inside the tray reception chamber 14 while the puller arm $P_2$ is fully inserted in the air lock chamber 15 with its obturator disk 26 hermetically sealing the valve seat aperture 17. The air-lock chamber 15 is thus open to the chamber 14 but hermetically sealed from the chamber 2. The pusher arm $P_3$ is fully inserted in the air-lock and cooling chamber 7 which is thus closed to the outlet region 4; while the puller arm $P_4$ is also fully inserted in the chamber 7 which is hermetically sealed from the chamber 6 by the engagement of the obturator 56 with the valve seat 55.

With this starting condition, the tray 12 under consideration is in the chamber 14, and is positioned on the pusher arm $P_1$ with its long sides resting on the tines 13a, 13b of this arm. Under the action of the lead-screw assembly 18, the arm $P_1$ and the tray 12 supported thereon are moved towards and into the air-lock chamber 15 where the tray 12 is transferred from the arm $P_1$ to the tines 28, 29 of the arm $P_2$ while, at the same time, the obturator disk 22 seals the corresponding valve seat aperture 16, hermetically closing the air-lock chamber 15 at that end adjacent the tray-reception chamber.

The lead-screw assembly 18 is stopped while the lead screw assembly 23 is activated, thereby moving the arm $P_2$ and its associated obturator disk 26 away from the airlock chamber 15 and from the valve seat 17. This movement continues until the tines 28 and 29 of the arm $P_2$, together with the tray they are supporting, are fully inside the inlet region 3 of the processing chamber 2.

At this point, the stepping conveyor 40 is started and, in a first step, moves the movable profiled members 43, 44 towards the tray 12. With this movement, the profiled members 43, 44 engage the notches 36, 37 in the tines 28, 29, and extend under the tray 12. Next, the movable profiled members 43, 44 are raised and lift the tray 12 away from the tines 28, 29. The profiled members 43, 44 are then moved horizontally away from arm P$_2$ and, finally, down to their original position to complete their cyclic movement and to deposit the tray into the first set of rectangular recesses 45 on the fixed profiled members 41, 42.

At this point, the arm P$_2$ and its associated obturator disk 26 are returned to the air-lock chamber 15 with the sealing of the valve seat 17. Once this is closed, the arm P$_1$ can be returned to the chamber 14 to receive a new tray 12 with its containers.

The conveyor 40 continues to operate through its cycle thus advancing the tray 12 stepwise into subsequent recesses 45 towards the outlet region 4 of the chamber 2. During this passage, the food contained in the various containers 9 is subjected to planned heat processes, for example pasteurization and/or sterilization and/or cooking by the processing fluids delivered by the ducts 39 and 39a.

By movements in reverse of those described for the collection of the tray 12 from the arm P$_2$, the conveyor 40 delivers the tray 12 and its containers of processed food to the arm P$_3$. A transfer trolley, such as that described in the aforementioned concurrently filed application, may be associated with and cooperate with, the conveyor 40 in this last operation.

The lead-screw assembly 48, 49 is now started and transfers the pusher arm P$_3$ with the tray it supports into the cooling and air-lock chamber 7. At the end of this movement, the pusher-arm P$_3$ is fully inside the chamber 7 while the obturator disk 52 fixed thereto seals the corresponding valve seat aperture 53. In the cooling and air-lock chamber 7, the tray 12 passes from the arm P$_3$ to the arm P$_4$ with the food undergoing a first cooling during this movement.

When this move is complete, the lead-screw assembly 57, 58 is activated and the arm P$_4$ and its associated obturator disk 56 are moved out of the cooling and airlock chamber 7 into the inlet zone 6a of the chamber 6 where the processed food is completely cooled.

While it is in the chamber 6, the tray 12 is collected by the conveyor 61 and advanced into the center of the chamber itself, while the obturator disk 56 returns to close its valve seat 55.

The expulsion assembly 65 operates in the center of the chamber 6 to free the containers 9 from the tray 12 and move them one at a time onto the shelf 71 which extends to one side of the conveyor 61, perpendicular thereto. Once the last container 9 has been removed, the free tray 12 continues towards the outlet end 6b of the chamber 6 while the containers 9 are pushed through the passage 62 into the chamber 63 where the closure assembly seals them under sterile conditions.

Figure 7:
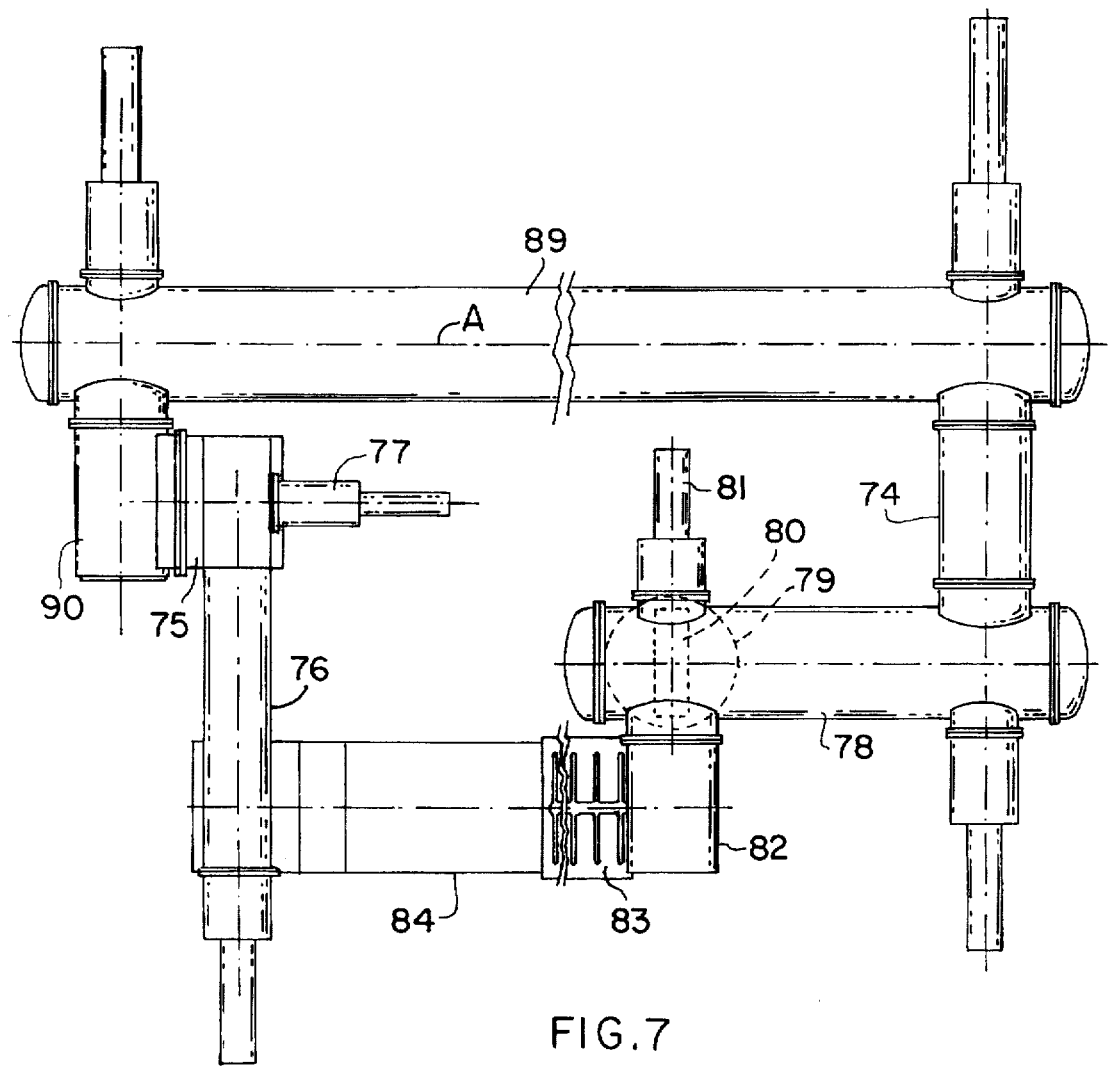
FIG. 7 is a schematic plan view of a second embodiment of a plant of the invention for the production of long-life cooked and/or sterilized food products.
Figure 8:
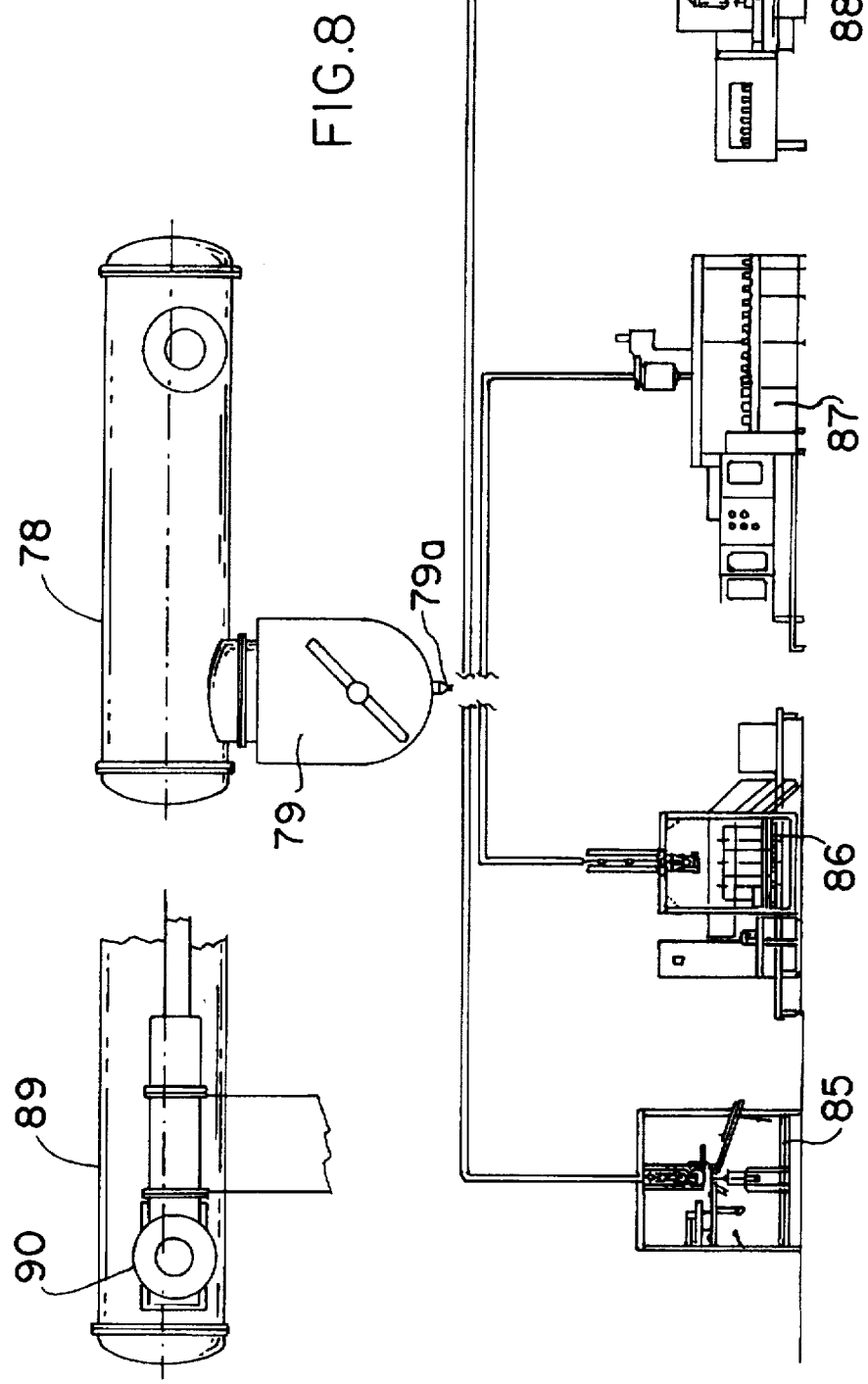
FIG. 8 is a schematic elevation of the plant of FIG. 7 partly cut away.

FIGS. 7 and 8 show a variant of the plant of the invention.

In particular, in this plant the food products to be processed are measured into large open containers, essentially large trays, each of which is shaped and dimensioned so as to fit longitudinally into the air-lock chambers and transversely on the stepping conveyors of the autoclave and the cooling chamber. To advantage, the above plant is designed as a closed loop.

Also in this variant, the plant of the invention includes an autoclave 89 the inner chamber of which, equipped for heat-processing food products, has tray inlet and outlet regions in communication with respective air-lock chambers 90, 74 extending to the same side of the autoclave.

A tray-reception chamber 75 communicates at one end with the inlet-side air-lock chamber 90 and at the other with a tray-conveyor system, schematically indicated at 76, which extends perpendicular to the axis A of the autoclave.

The means 77 for transferring the trays from the reception chamber 75 to the air-lock chamber 90 (means which may be constituted by a lead-screw assembly as described with reference to FIG. 1 or by pneumatic means or the like) operate along a straight line parallel to the axis A of the autoclave.

The air-lock and cooling chamber 74 communicates at its outlet end with the inlet region of the cooling chamber 78 which, it should be remembered, is sterile. This cooling chamber 78 extends parallel to the autoclave 89 and towards the inlet region thereof.

The cooling chamber 78 communicates with a sterile tank 79 for collecting the processed product arranged beneath the cooling chamber 78 itself; a tray-emptying device, schematically indicated 80, is arranged in the cooling chamber 78 in correspondence with the sterile tank 79 and is preferably constituted by a device for tipping the trays.

Once emptied of the processed product, the trays are removed from the cooling chamber 78 by transfer means 81 and are collected in a further chamber 82 from whence they are sent to a washing station 83 and are subsequently returned by a conveyor system 84 extending parallel to the autoclave 89 to the conveyor system 76 mentioned above, thus closing the loop of this embodiment of the plant of the invention.

The sterile tank 79 into which the processed (stabilized and/or sterilized, cooked) product is emptied may be in fluid communication, through one or more outlets 79a, with respective ducts for supplying, for example: a sterile filling machine 85 for filling bags of a few kilograms up to 25–30 kg; a sterile filling machine 86 for filling bags of 50–250 kg or 400–1200 kg; a sterile filling machine 87 for filling paper cartons; and/or a filling-metering machine 88 for filling a vast range of glass jars and the like.

Figure 6:
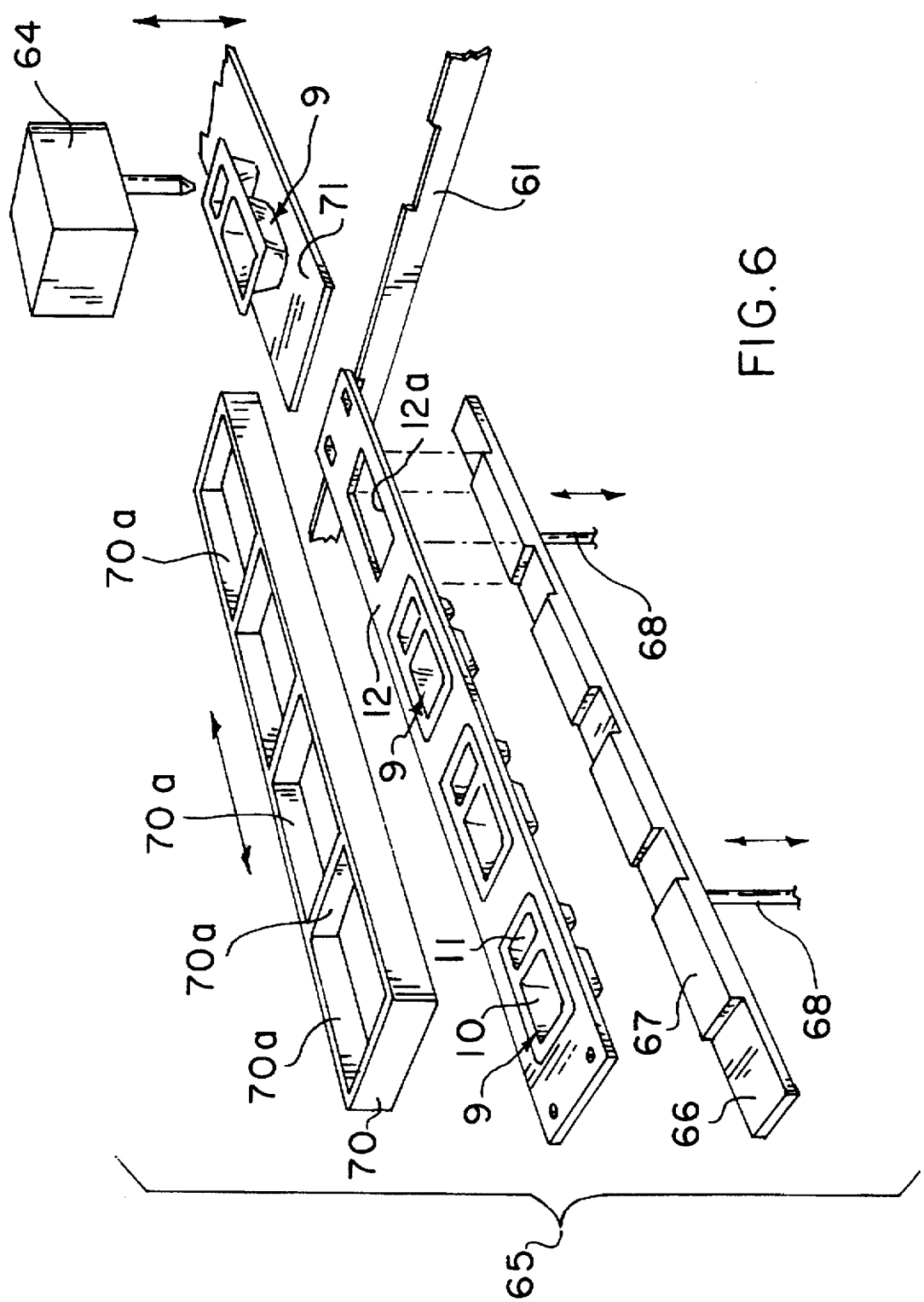
FIG. 6 is a schematic perspective view of a device for removing dishes from their respective supports according to the present invention.

It should be noted that an expulsion device 65 of the type described with reference to FIG. 6 could be arranged in the cooling chamber 78 since, although this device is not used in this second plant (in which the food products are loaded into large trays), it would make it suitable for use with products measured into dished containers supported on flat trays (like those described in the first plant).

We claim:

1. A plant for the industrial production of long-life, ready-to-eat cooked food, in open containers (9) comprising:

a continuous autoclave (1) defining a processing chamber (2) for processing the food; said processing chamber (2) including a food inlet region (3) and an outlet region (4); said autoclave (1) further including means (39, 39a) for delivering and metering fluids for cooking or heat-sterilizing the food;

first and second apertures (17, 53) formed in said inlet region (3) and said outlet region (4) respectively;

a first air-lock chamber (15) in communication with said first aperture (17) and with said inlet region (3);

a second air-lock chamber (7) in communication with said second aperture (53) and with said outlet region (4);

said first and second apertures (17, 53) being fitted with first and second valve closure members (26, 52) respectively;

a first transfer device (P$_2$) disposed in said processing chamber (2) for transferring the open containers (9) from said first air-lock chamber (15) to said inlet region (3);

a second transfer device (P₃) in said processing chamber (2) for transferring the open containers (9) from said outlet region (4) to said second air-lock chamber (7);

a sterile food-cooling chamber (6) having an inlet end (6a) and an outlet end (6b);

a third aperture (55) formed in said sterile food-cooling chamber; said third aperture (55) being fitted with a third valve closure member (56);

said sterile food-cooling chamber (6) communicating with said second air-lock chamber (7) through said third aperture (55);

a sterile closure chamber (63) in communication with said sterile food-cooling chamber (6);

closure means (69) for hermetically sealing cooked food disposed within said sterile closure chamber (63); and means (P₄, 38) for transferring the containers (9) from said second air-lock chamber (7) to said cooling chamber (6) and subsequently to said closure means (69).

2. A plant as defined in claim 1 together with a support tray (12), said open containers (9) being arranged on said support tray (12).

3. A plant as defined in claim 2, wherein a plurality of said container (9) are arranged in least one line on said support tray (12).

4. A plant as defined in claim 3, wherein said containers (9) each comprise a dish-shaped body with a flat peripheral edge (9a) projecting outward.

5. A plant as defined in claim 4, wherein said support trays(12) each comprise a flat element having a plurality of windows (12a) arranged in at least one line and of such a size as to be engageable by the bodies of the containers (9).

6. A plant as defined in claim 1, together with a stepwise operating conveyor (61) disposed within said cooling chamber (6) and extending from the inlet end (6a) to the outlet end (6b) thereof.

7. A plant as defined in claim 6, together with a tubular passage (62) disposed between said cooling chamber (6) and said closure means; and a delivery-metering means (64) within said tubular passage (62) for dispensing condiments in general.

8. A plant as defined in claim 7, together with expulsion means (65) disposed in said sterile cooling chamber (6) adjacent the tubular passage (62) for releasing the containers (9) from said trays (12).

9. A plant as defined in claim 1, together with a sterile tank (79) for collecting the processed products; said sterile tank (79) being in communication with said sterile cooling chamber (6); means (80) adjacent said sterile tank (79) for emptying the cooked food from said containers (9); a sterile filling unit (85, 86, 87 or 88) in communication with said sterile tank (79); and means for transferring the cooked food to said filling unit.

10. A plant as defined in claim 1, together with a container reception chamber (14); said first air-lock chamber (15) further including a fourth aperture (16); said fourth aperture (16) being fitted with a fourth valve closure member (22), and means (13a, 13b) for transferring the containers (9) from said reception chamber (14) to said first air-lock chamber (15).

* * * * *